United States Patent [19]
Adams

[11] 3,984,921
[45] Oct. 12, 1976

[54] UNITARY DRIER

[76] Inventor: William Charles Adams, 185 Nassau Drive, Pittsburgh, Pa. 15239

[22] Filed: Dec. 6, 1974

[21] Appl. No.: 530,284

[52] U.S. Cl. ............................ 34/243 C; 34/229; 34/233
[51] Int. Cl.² ........................................ F26B 19/00
[58] Field of Search ............ 34/222, 229, 231, 232, 34/233, 218, 219; 118/58; 126/271.1; 432/62, 24, 222, 221; 15/DIG. 2, DIG. 7

[56] References Cited
UNITED STATES PATENTS

| | | | |
|---|---|---|---|
| 1,368,537 | 2/1921 | Barducci | 34/222 |
| 2,848,820 | 8/1958 | Wallin et al. | 34/23 |
| 3,007,256 | 11/1961 | Rouy | 34/218 |
| 3,809,527 | 5/1974 | Newman | 126/271.1 |

FOREIGN PATENTS OR APPLICATIONS

| | | | |
|---|---|---|---|
| 2,148,135 | 4/1972 | Germany | 34/243 C |

Primary Examiner—Kenneth W. Sprague
Assistant Examiner—James C. Yeung
Attorney, Agent, or Firm—Fred C. Trenor

[57] ABSTRACT

A unitary drier for use in drying the under portion of an automotive vehicle having a vertically disposed forced air inlet duct, a source of forced air in cooperative association with the air inlet duct, means for heating the source of forced air to a predetermined temperature, and a horizontally disposed forced air dispersing duct connected to the air inlet duct that is capable of being placed underneath the automotive vehicle. The dispersing duct has a plurality of uniformly arranged forced air discharge means to discharge a uniform array of heated air to the under portion of the automotive vehicle whereby moisture is removed from the under portion of the automotive vehicle by the force of the heated air impinging on the under portion and by evaporation.

11 Claims, 11 Drawing Figures

UNITARY DRIER

BACKGROUND OF THE INVENTION

This invention relates to driers for use with automotive vehicles, and particularly, to driers adapted for drying the under portion of automotive vehicles after they have been washed to clean and remove debris, dirt and accumulations therefrom.

Heretofore, a large business has developed in the preservation of automotive vehicles with protective coatings that are adhered to the under portion of automotive vehicles and other portions thereof subject to rust and other forms of body deterioration. Usually, such protective coatings are applied after the vehicle has been initially treated by the automotive dealer. Such treatments being commonly referred to as "rust-proofing."

Typically in such business a chemical solution or formulation is prepared and manually or mechanically applied to the under portion of the automotive vehicle and injected into other portions of the vehicle such as, for example, rocker panels, doors and the like, by techniques well known to those skilled in the art.

In the application of such coatings to the under portion of the automotive vehicle it is necessary to clean the under portion with high velocity jet streams of water or steam to remove dirt, grime, and accumulations thereof from the vehicle so that the coating will adhere to the under portion. After the under portion has been thoroughly washed and scrubbed and all fragments of dirt, loose metal and the like removed therefrom, it is usual to apply heat to the under portion to dry the vehicle so that the protective coating can be subsequently applied.

Servicemen use heaters, usually gas heaters to quickly evaporate the water from the under portion so that a dry surface is provided to which the protective coating can be applied. It is not at all unusual for such servicemen in their haste to dry the under portion of the automotive vehicle to actually burn, sometimes melt or even set fire to the various parts of the automotive vehicle that are exposed to the open flame of the torch. As a result, considerable damage is done to the vehicle. Moreover, considerable time in the form of man hours is lost as a result of requiring servicemen to physically and manually expose the gas heater to the under portion of the automotive vehicle.

Quite surprisingly, I have developed a device that is extremely safe and efficient for use in drying the under portions of automotive vehicles. My device physically removes the water from the under portion as well as evaporates the moisture therefrom without damage to the under portion of the vehicle and without any fire hazard. Moreover, my invention does not require constant surveillance by a serviceman and is automatic, thereby relieving him of the need to supervise the drying operation. Thus, he may be free to perform other more useful functions in the operation of applying protective coatings to the under portions of automotive vehicles.

DESCRIPTION OF THE PRIOR ART

The use of automotive driers for drying the exterior body of automobile vehicles after they have been washed and scrubbed are well known in the art. For example, U.S. Pat. No. 2,448,834 (Rousseau) and U.S. Pat. No. 2,663,951 (Kennison) disclose driers for use in conjunction with automatic or semi-automatic automotive vehicle washing apparatus commonly encountered in the typical car wash operation. Such driers are used exclusively for drying the roofs and sides of the automotive body after it has been washed and scrubbed. They are extremely complicated and complex equipment. The devices of these two patents use a source of forced air, a forced air manifold and a series of baffles to direct an array of forced air onto the automotive body surfaces to sweep the water therefrom and to evaporate moisture from the body surface. The forced air manifold in both instances is disposed above and down the sides of the path through which the automobile passes. These patents do not disclose nor reveal the utility of using heated forced air to dry the under portions of automotive vehicles as a preparatory step in applying protective coatings thereto, nor disclose the means or manner by which such purposes could be achieved.

The use of sources of forced air for drying other commodities, but not automotive vehicles, are certainly well known in the art. Yet, such devices do not disclose the means nor manner by which heated forced air can be directed to the under portions of automotive vehicles. Moreover, the devices in the prior art do not disclose the additional features of my claimed invention, nor the manner of combining the various features of my invention into a unitary device that is simple, economical and efficient to use.

SUMMARY OF THE INVENTION

In accordance with my invention, a unitary device for use in drying the under portion of an automotive vehicle is capable of being disposed into cooperative association with such automotive vehicles and its under portion. The device has a vertically disposed forced air inlet duct that is capable of being placed adjacent to the automotive vehicle; a source of forced air in cooperative association with the forced air inlet duct; means for heating the source of forced air to a predetermined temperature in cooperative association with said forced air inlet duct; and, a horizontally disposed forced air dispersing duct connected to the forced air inlet duct that is capable of being placed under the automotive vehicle. The dispersing duct has a plurality of forced air discharge means that are uniformly arranged and that are adjacent to the under portion of the automotive vehicles for discharging a uniform array of forced and heated air that impinges on the under portion of the automotive vehicle.

In one embodiment of my invention the unitary drier is a permanent device for use in the stall of a common automotive garage. The dispersing duct has a planar surface adjacent the under portion of the automotive vehicle that is substantially coextensive therewith. In the planar surface there are a plurality of aligned elongate slots that are disposed around the periphery of the planar surface so that a uniform array of forced and heated air impinges on the under portion of the vehicle. The permanent drier may include a wheel guide means adjacent to the dispersing duct for receiving and guiding the wheels of the automotive vehicle so that it can be driven over and into cooperative association with the drier.

In another embodiment of my invention the unitary drier is a portable device that can be moved about and placed under the automotive vehicle. The dispersing duct has a planar surface adjacent the under portion of the automotive vehicle that is substantially coextensive with the width of the under portion and the longitudinal distance between the wheel axis of the automotive vehicle.

Both embodiments of the unitary drier may include a device for regulating the relative humidity of the forced and heated air that emanates from the dispersing duct.

Both embodiments of the unitary drier may also include a means for directing cleaning fluids such as, for example, jet streams of water or steam against the under portion of the automotive vehicle to clean debris, dirt and grime therefrom.

GENERAL DESCRIPTION OF THE DRAWINGS

DETAILED DESCRIPTION OF THE INVENTION

Figure 1:
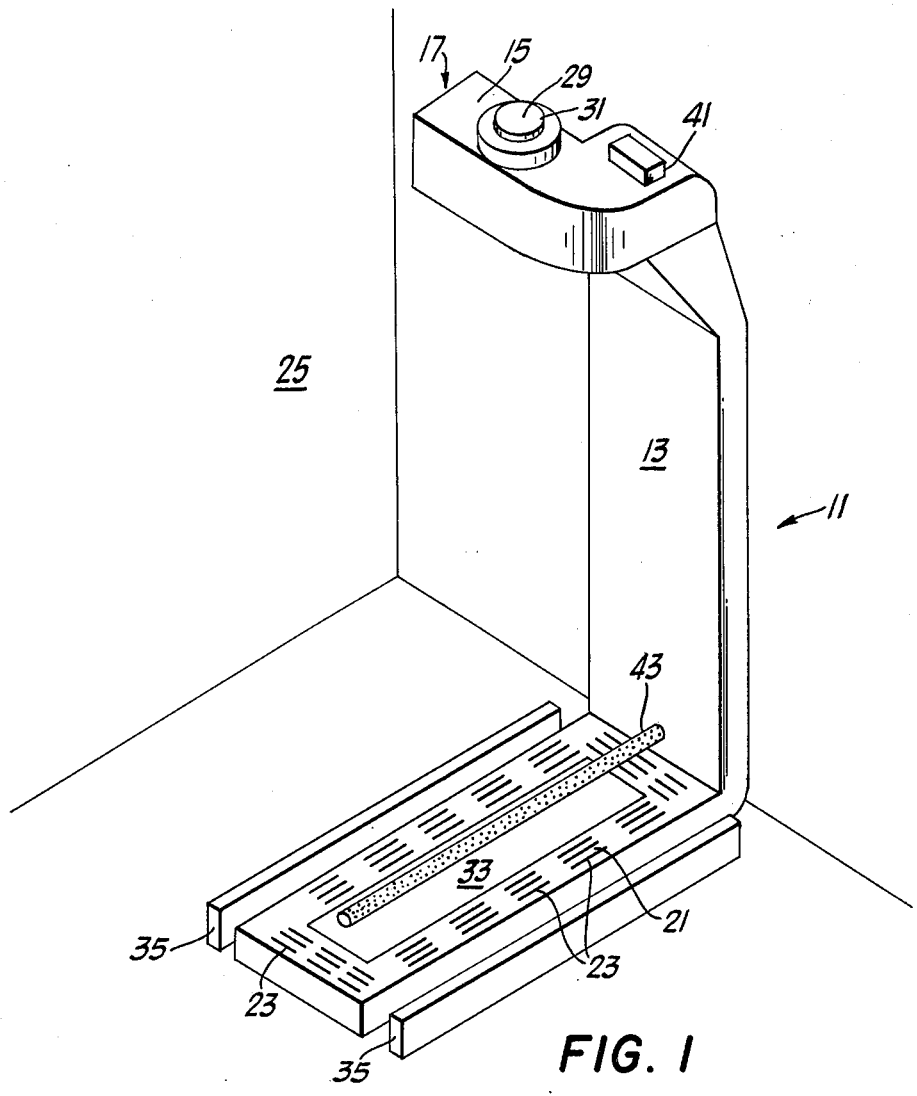
FIG. 1 is a perspective view of a preferred embodiment of my invention in the environment of a garage in which the use of my invention is contemplated.

In FIG. 1 there is illustrated the unitary device generally indicated at 11 having a substantially vertically disposed air inlet duct 13 a source of forced and heated air generally indicated at 15 connected to duct 13 having an air inlet aperture generally indicated at 17 for the inhalation of air from the environment and a horizontally disposed dispersing duct 21 that is connected to the air inlet duct 13. The air dispersing duct 21 has a plurality of forced air discharge means 23 that are uniformly arranged on the dispersing duct 21.

Figure 2:
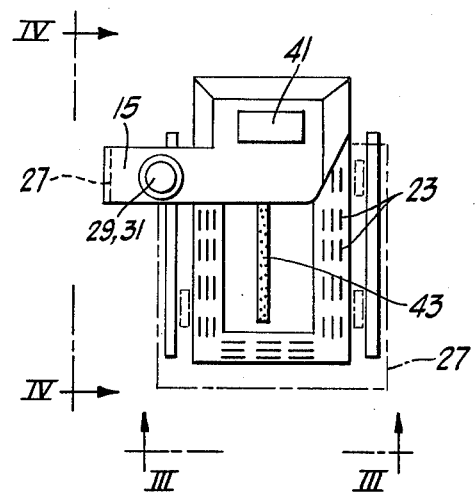
FIG. 2 is a top planar view of the device of FIG. 1 with an automobile in phantom lines being illustrated in cooperative association with the device.
Figures 3, 4:
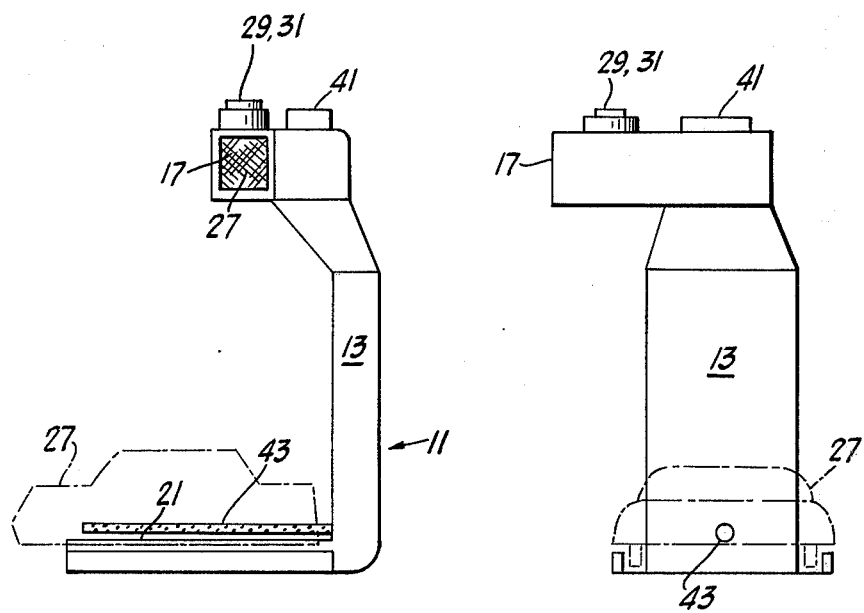
FIG. 3 is a front elevation view of the device of FIG. 2 taken at line III—III.
FIG. 4 is a side elevation view of the device of FIG. 2 taken at line IV—IV.

The unitary device 11 as shown in FIGS. 1–4 is a complete structure in which all of the parts are connected together as a single unit. The device 11 is conveniently disposed in an automotive garage generally indicated at 25 in which its use is contemplated. An automobile 27 illustrated in phantom lines in FIGS. 2–4 is shown in cooperative association with the dispersing duct 21 so that the under portion of the automobile is in close proximity to and adjacent to the dispersing duct.

The device 11 illustrated in FIG. 1 is relatively a large device in comparison to the structure of the automobile itself, and in this particular embodiment, the device is contemplated as a permanent device that may be conveniently installed in one of the stalls of an automotive garage.

The source of forced and heated air in FIG. 1 comprises a blower or fan 29 and a heater or heating element 31 contained in a single unit that can readily be removed and repaired or replaced with a new unit in the event of mechanical failure or the like. The blower 29 draws ambient air into the inlet duct 13 through aperture 17 and the heater 31 heats such air to a predetermined temperature, if needed or desired. Preferably, an air filter 27 is placed in the aperture 17 and is substantially coextensive therewith to filter dust particles and the like from the air whereby the life and integrity of the device is extended. Any air filters well known to those skilled in the art may be used.

While the blower and fan as illustrated in FIG. 1 comprise a single unit those skilled in the art may desire to use a separate blower and heater. In any event, combination blower and heater units or separate blower and heater units well known to those skilled in the art may be used such as, for example, gas or oil fired heaters or electric heaters. In the event that gas or oil fired heaters are used they should be disposed at least 6 feet above ground level to avoid the possibilities of the open flames of such heaters igniting volatiles.

I have determined that the types of blower and heater units contemplated for use in my invention should have an air capacity of 1,800 cubic feet per minute and an energy capacity of 120,000 b.t.u.s per hour to generate the necessary volume and temperature of air for adequate drying of the under portions of typical automobiles in accordance with my invention.

The blower 29 and heater 31 in FIG. 1 are disposed near the aperture 17; however, their location within the device is not critical. For instance, the blower and heater could be disposed further downstream of the aperture than their location as illustrated in FIG. 1.

The forced air inlet duct 13 follows the blower and heater and as illustrated in FIG. 1 has substantially a rectangular cross-sectional configuration of a size and dimension adequate to handle the volume of air generated in accordance with my invention. While the cross-sectional configuration is illustrated as being rectangular, other cross-sectional configurations may be used in accordance with my invention.

The inlet duct 13 is substantially disposed in a vertical, upright position. The particular orientation is not critical to my invention but the upright position is preferred as it most effectually uses the space of a garage. One desirable feature of a vertical inlet duct is that the aperture 17 is elevated near the ceiling of the garage where cleaner air is more available and thus the life and integrity of the device is extended.

Extending from the air inlet duct 13 is the dispersing duct 21 that is disposed in a substantially horizontal position and designed to extend underneath an automobile. The dispersing duct 21 is substantially coextensive with the under portion of a typical automobile and thus has fixed dimensions corresponding to the standard dimensions of automobiles commonly treated by those skilled in the art. The dispersing duct 21 has a length that is substantially equal to the length of the under portion of the automobile and a width that is substantially equal to the width of the under portion, but less than the distance between the wheels of the same axle of the automobile. This arrangement is a desirable feature of my invention as the automobile may conveniently be driven over the dispersing duct.

The dispersing duct 21 like the inlet duct is a substantially rectangular duct having a top planar surface 33, although the configuration of the surface is not particularly critical to my invention and other cross-sectional configurations may be used in accordance with my invention.

On the planar surface 33 there is disposed a plurality of air dispersing means 23 and in the embodiment of FIG. 1, such devices are elongate slots of equal width and length. The elongate slots are arranged about the periphery of the recntangular surface 33. In the practice of my invention, I have discovered that this particular arrangement more efficiently removes the moisture from the under portion of the automobile vehicle and more efficiently evaporates the moisture therefrom.

Alternatively, other arrangements of the air-dispersing means may be employed in accordance with my invention. While elongate slots are illustrated in the drawings, apertures of uniform diameter could be employed in a random and uniform distribution on the surface 33 or other apertures of different configurations could be used.

Figure 9:
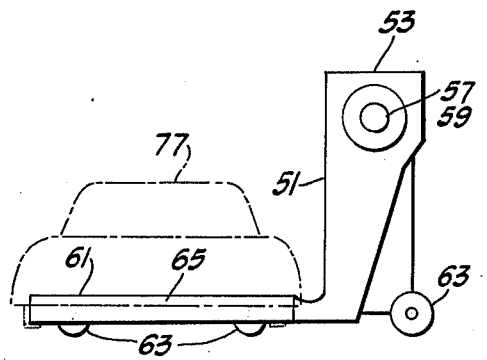
FIG. 9 is a side elevation view of the device of FIG. 7 taken at line IX—IX.
Figure 10:
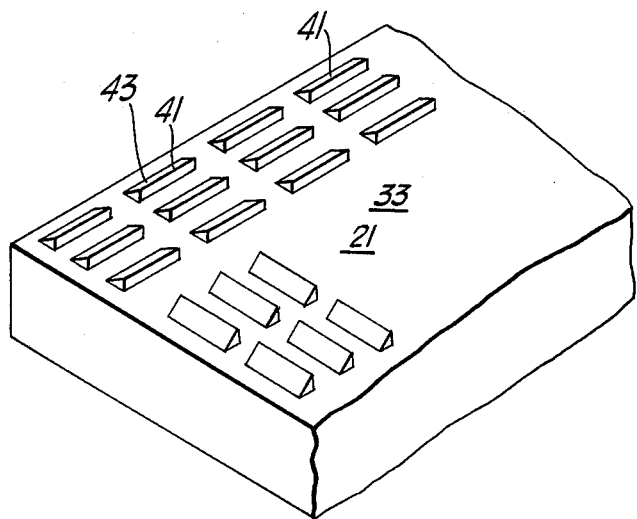
FIG. 10 is a partial perspective view of another embodiment of the dispersing duct of FIG. 1 in accordance with my invention; and, FIG. 11 is a front elevation view of the device of FIG. 10 taken at line XI—XI.
Figure 11:
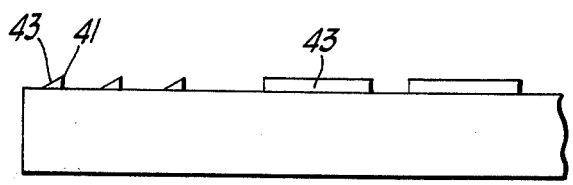

Another embodiment of the dispersing duct and air discharge means of my invention is illustrated in FIG. 10. Rather than using slots as the air discharge means baffles 41 are illustrated having a flange 43 extending above the planar surface 33 of the dispersing duct 21 to provide direction to the forced air emanating from the duct. As shown in FIG. 11 each flange, from the outermost to the innermost have the same angle of inclination to the planar surface; however, their angle of inclination could vary from the outermost to the innermost flange to provide different direction to the array of forced air. Such an arrangement would be desirable to facilitate the sweeping of water on the under portion of the automotive vehicle towards the center thereof or towards the edges thereof depending on the orientation of the flanges.

In FIGS. 1–4 the device includes wheel guides 35 that are parallel to each other and that are arranged along the dispersing duct 21 and parallel to it. The wheel guides conveniently guide the automobile as it approaches the dispersing duct, so that the vehicle is accurately positioned over the dispersing duct.

In FIG. 1 an additional feature of my invention is illustrated that includes a humidity controlling device 41 useful for controlling the humidity of the forced air so that maximum efficiency in facilitating evaporation may be achieved. Such a device is well known to those skilled in the art and may be used to decrease the humidity as the need arises to promote and facilitate the evaporation.

In FIG. 1 another additional feature of my invention is illustrated including means for cleaning the under portion of the automobile. It comprises a discharge pipe 43 connected to the dispersing duct and to a source of cleaning fluids (not shown) that is capable of directing a plurality of streams of cleaning fluid, such as, for example, water, steam, and the like against the under portion of the automobile vehicle. This feature may be utilized to facilitate the removal of dust, dirt and grime and the accumulations thereof from the under portions of the automobile as a preparatory step to the application of a protective coating. When such a feature is made a part of my invention, covers over the air discharge means or baffles are necessary to prevent the dispersing duct from entraining water, moisture or cleaning fluid and the like. Any type of device such as a flutter valve or the like may be employed to prevent the entrapment of water into the air dispersing duct 21.

In FIG. 5 the chart illustrates the theoretical effects of such factors as volume of forced air, its temperature and relative humidity of the efficiency of water removal for the device illustrated in FIGS. 1–4. Lines A–E appearing on the chart represent the correlation of the volume of air per minute impinging on the under portion of the automotive vehicle to the pounds of water evaporated per minute. For instance, the temperatures and relative humidity for Line A is 70°F. at 100 percent relative humidity; for Line B 90°F. at 25 percent relative humidity; for Line C 94°F. at 10 percent relative humidity; for Line D 90°F. at 25 percent relative humidity; and for Line E 124°F. at 5 percent relative humidity. Line E represents the more efficient conditions for rapid water removal and evaporation where the air temperature is relatively high and the relative humidity is relatively low, whereas Line A represents the less efficient conditions where the air temperature is relatively low and the relative humidity is relatively high.

Theoretically the desired rate of water removal should be at least 11 pounds of water evaporated per minute which would completely evaporate all water and moisture in 10 to 15 minutes. This minimum rate is preferred and sufficient for use in the typical operation of my invention normally encountered by those skilled in the art. As is evident by an examination of the chart, a variety of temperatures and relative humidities are available for use in accordance with my invention.

In FIG. 6 another embodiment of my invention is illustrated which is a portable device and not a permanent device, it is a complete self-contained structure in which all of the parts are connected together as a single unit. The portable device comprises a substantially vertically disposed forced air inlet duct 51 having an air intake aperture 53 which is substantially co-extensive with the duct. Disposed within the aperture is an air filter 55. Air filters well known to those skilled in the art may be used in accordance with my invention.

Downstream of the aperture area is a blower 57 inside the air duct 51 and a heating element 59. As contemplated by the present invention, the blower and heating element comprise a single unit, however, those skilled in the art may desire to use a separate blower and a separate heating facility. The portable device of FIG. 4 contemplates the use of a 20 kilowatt electric heater and a twin blower capable of producing 2,800 cubic feet per minute.

Connected to the air inlet duct 51 is an air-dispersing duct 61 that is disposed in a substantially horizontal position capable of being placed under the under portion of the automotive vehicle. In fact, the entire device illustrated in FIGS. 7–9 is mounted upon wheels 63 thereby rendering it portable for insertion into and out from the under portion of the automobile. As illustrated in FIGS. 7–9 the air inlet duct 51 and the air dispersing duct 61 have rectangular cross-sectional configurations, although other cross-sectional configurations may be used in accordance with my invention.

The air dispersing duct 61 comprises a planar surface 65 that is substantially rectangular in its planar configuration and depending therefrom is a substantially vertical side wall 67 and inclined end walls 69a and 69b. The planar surface 65 has a plurality of forced air discharge means 71 that are elongate slots running substantially the length of the planar surface 65. The end walls 69a and 69b are inclined towards each other and have discharge means 73 that are elongate slots running substantially the length of the end walls. The discharge means in the end wall are arranged in this fashion to provide an array of heated air towards the rear and front portions of the under portions of the automobile vehicle 77 as illustrated in FIGS. 6–9.

As illustrated in FIG. 6–9 the dispersing duct 61 has a width that is substantially equal to the width of the under portion of the automobile and a length that is substantially equal to the distance between each pair of wheels of the automobile. Thus the portable device is capable of being inserted transversely under the automotive vehicle 77 and likewise removed without the need of driving the automobile. The device is compact and portable so that it can be moved about by a serviceman.

While the arrangement of the air dispersing means at 71 and 73 are elongate slots, baffles may also be used in accordance with the invention. Other configurations for dispersing means may be contemplated by those skilled in the art to provide a uniform array of forced and heated air impinging the under portion of the automotive vehicle.

Figure 5:
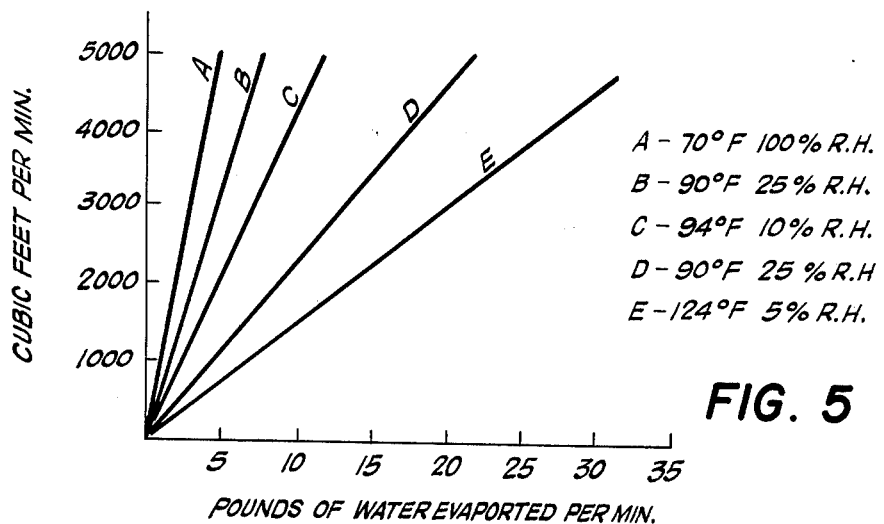
FIG. 5 is a chart in which the abscissa is marked in cubic feet per minute of air and the ordinate is marked in pounds of water evaporated per minute bearing various lines indicating the theroetical efficiency of water removal at different relative humidities, temperatures and flow rates of air for the device of FIG. 1.
Figure 6:
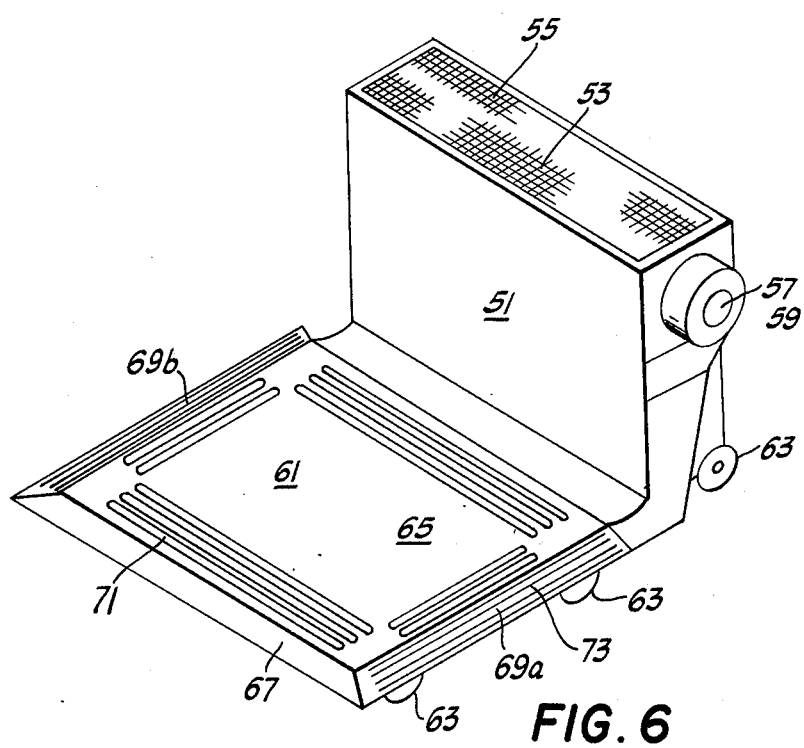
FIG. 6 is a perspective view of another embodiment of my invention that is portable and movable on wheels.

In the use of the permanent device 11 in FIGS. 1–4 the under portion of the automobile is first cleaned of debris, dirt, grime and accumulations thereof. In the event that my device having the additional feature of the cleaning means 43 is used as shown in FIGS. 2–4, the automobile 27 is driven over the dispersing duct 21 being guided thereon by wheel guides 35. Cleaning fluids such as water or steam are discharged from the discharge pipe 43 at a high velocity whereby the debris, dirt and accujulations thereof are removed. In the event that my device does not have the additional feature of the cleaning means 43, the under portion is cleaned by any manner well known to those skilled in the art; and, the automobile is then driven over the dispersing duct 21 being guided thereon by wheel guides 35. The temperature and relative humidity of the ambient air is measured by techniques well known to those skilled in the art. The desired flow of air may be determined in accordance with the chart in FIG. 5 to attain the desired rate of water removal. In the event that the temperature of ambient air is too low to achieve the desired rate of water removal the user may adjust the temperature of the air by using the heater 31 to heat the air to a predetermined temperature. In the event that the relative humidity of ambient air is too high, the user may adjust the relative humidity of the air by using the humidity control means 41 to reduce the relative humidity to a predetermined level.

The forced and heated air having the predetermined temperature and relative humidity is directed against the under portion of the automobile until the water and moisture are removed therefrom. Subsequently the automobile is removed from my device for the application of the protective coating using any technique well known to those skilled in the art.

Figure 7:
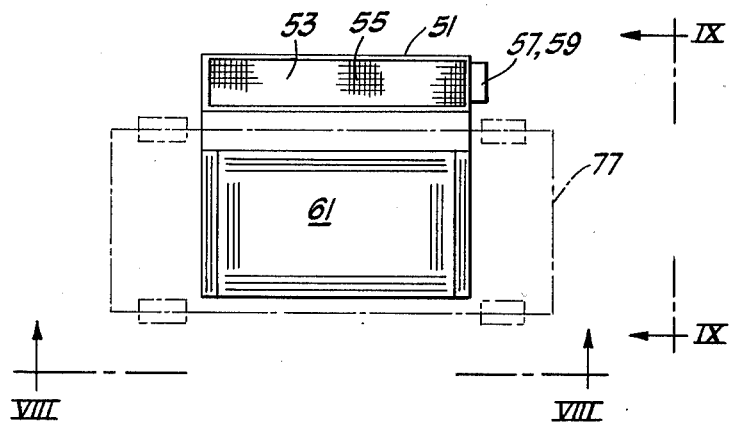
FIG. 7 is a top planar view of the device of FIG. 6 with an automobile in phantom lines being illustrated in cooperative association with the device.
Figure 8:
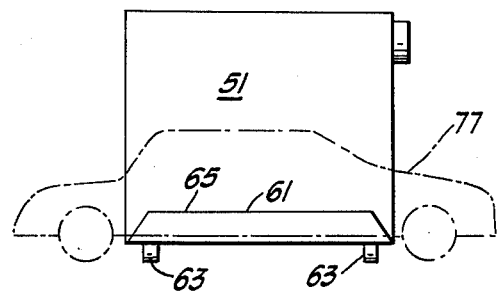
FIG. 8 is a front elevation view of the device of FIG. 7 taken at line VIII—VIII.

In the use of the portable device 51 in FIGS. 6–9 the under portion of the automobile is first cleaned of debris, dirt and accumulations thereof in any manner well known to those skilled in the art. The portable device 51 is manually moved into cooperative association with the automobile 77 by inserting transversely the device between the wheels of the automobile as shown in FIGS. 7–9. The temperature and relative humidity of the ambient air is measured by techniques well known to those skilled in the art and adjusted if necessary. The forced and heated air is directed against the under portion of the automobile until the water and moisture is removed therefrom. Subsequently, the portable device 51 is removed from under the automobile 77 and the protective coating is applied in accordance with techniques well known to those skilled in the art.

Accordingly, my invention provides a simple, efficient and effective method of removing water from the under portion of an automotive vehicle after being cleansed of its dirt, grime and accumulation thereof without the dangers of fire and damage to the automobile under portion as existing now in the present state of the art. The device is simple and efficient to operate and quicly removes the water and moisture therefrom. The device may be employed in existing garage facilities either as a permanent device or as a portable device, depending upon the physical needs and sizes of the garage operation.

What is claimed is:

1. A unitary device for use in drying the under portion of an automotive vehicle that is capable of being disposed into cooperative association with said automotive vehicle and its under portion comprising:
    a. A vertically disposed forced air inlet duct that is capable of being placed adjacent to said automotive vehicle;
    b. A source of forced air in cooperative association with said forced air inlet duct;
    c. Means for heating said source of forced air to a predetermined temperature in cooperative association with said forced air inlet duct; and
    d. A horizontally disposed forced air dispersing duct connected to said forced air inlet duct that is substantially coextensive with said under portion of said automotive vehicle that is capable of being placed under said under portion of said automotive vehicles; said dispersing duct having a plurality of forced air discharge means that are arranged adjacent to said under portion of said automotive vehicle for discharging an array of forced and heated air impinging on said under portion.

2. The device of claim 1 wherein said plurality of forced air discharge means comprise a plurality of aligned elongate slots.

3. The device of claim 1 wherein said plurality of forced air discharge means comprise a plurality of aligned baffles.

4. The device of claim 1 wherein said dispersing duct has a substantially rectangular cross-sectional configuration that is substantially coextensive with said under portion of said automotive vehicle; and said plurality of forced air discharge means comprise a plurality of aligned elongate baffles disposed about the entire periphery of said cross-sectional configuration; said baffles being capable of directing said forced and heated air towards said under portion.

5. The device of claim 1 including means for regulating the humidity of said source of forced air.

6. The device of claim 1 including wheel guides adjacent to said dispersing ducts for receiving and guiding the wheels of said automotive vehicles so that the said automotive vehicle can be driven into cooperative association with said device.

7. The device of claim 1 being portably mounted on wheels so that said device can be moved into cooperative association with said automotive vehicle.

8. The device of claim 1 including means for directing streams of cleaning fluids against said under portions of said automotive vehicles to clean debris from said under portion.

9. The device of claim 8 wherein said cleaning fluid is steam.

10. A stationary, unitary device for use in drying the under portions of automotive vehicles having wheels comprising:
   a. A source of forced air;
   b. A forced air manifold having:
      i. A forced air inlet portion to which said source of forced air is connected;
      ii. Means for heating said source of forced air to a predetermined temperature;
      iii. A horizontally disposed forced air dispersing portion having a plurality of aligned elongate air discharge means that are arranged to expel an array of forced heated air to the under portion of said automotive vehicles; said forced air dispersing portion having a predetermined width that is substantially equal to the width of said under portion of said automotive vehicle and a predetermined length that is substantially equal to the length of said under portion so that said automotive vehicle may be driven and positioned over said dispersing portion; and,
      iv. Means for receiving and guiding said wheels of said automotive vehicle so that said vehicle may be accurately positioned over said dispersing portion.

11. A portable, unitary device for use in drying the under portions of automotive vehicles having two pairs of wheels comprising:
   a. A source of forced air;
   b. A forced air manifold having:
      i. A forced air inlet portion to which said source of forced air is connected;
      ii. Means for heating said source of forced air to a predetermined temperature;
      iii. A horizontally disposed forced air dispersing portion having a plurality of aligned elongate air discharge means that are arranged to expel an array of forced heated air to the under portion of said automotive vehicles; said forced air dispersing portion having a predetermined width that is substantially equal to the width of said under portion of said automotive vehicle and a predetermined length that is substantially equal to the distance between both pairs of wheels so that said device may be disposed transversely under said automotive vehicle; and,
      iv. Wheels being mounted to said forced air dispersing portion so that said device is portable.

* * * * *